(12) United States Patent
Tokuhara et al.

(10) Patent No.: US 11,313,428 B2
(45) Date of Patent: Apr. 26, 2022

(54) STROKE SENSOR SYSTEM AND SHOCK ABSORBER

(71) Applicant: Showa Corporation, Gyoda (JP)

(72) Inventors: Masato Tokuhara, Fukuroi (JP); Kota Suzuki, Fukuroi (JP); Yosuke Fujikawa, Fukuroi (JP); Naoya Kuroiwa, Fukuroi (JP); Yosuke Murakami, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 107 days.

(21) Appl. No.: 16/799,289

(22) Filed: Feb. 24, 2020

(65) Prior Publication Data

US 2020/0191228 A1 Jun. 18, 2020

Related U.S. Application Data

(63) Continuation of application No. PCT/JP2017/038972, filed on Oct. 27, 2017.

(30) Foreign Application Priority Data

Oct. 18, 2017 (JP) .............................. JP2017-201851

(51) Int. Cl.
*F16F 9/32* (2006.01)
*F16F 9/19* (2006.01)
(Continued)

(52) U.S. Cl.
CPC .............. *F16F 9/3292* (2013.01); *F16F 9/19* (2013.01); *F16F 9/38* (2013.01); *F16F 13/007* (2013.01);
(Continued)

(58) Field of Classification Search
CPC .......... F16F 9/3292; F16F 9/19; F16F 13/007; F16F 9/38; F16F 9/58; F16F 2224/025;
(Continued)

(56) References Cited

U.S. PATENT DOCUMENTS

| 4,974,707 A | 12/1990 | Neumann et al. |
| 5,411,243 A | 5/1995 | Gennesseaux |

(Continued)

FOREIGN PATENT DOCUMENTS

| EP | 0211442 A1 | 2/1987 |
| JP | 2007-242635 A | 9/2007 |

(Continued)

OTHER PUBLICATIONS

Translation of European Patent No. EP 0211442 obtained from website: https://worldwide.espacenet.com on Aug. 3, 2021.*

(Continued)

*Primary Examiner* — Pamela Rodriguez
(74) *Attorney, Agent, or Firm* — Leason Ellis LLP

(57) ABSTRACT

A stroke sensor system includes a conductor, a coil which moves relative to the conductor and is fitted to one end side of the conductor; and a ferromagnetic body which is arranged on an end position side of the coil. A position of an end portion on one end side of the conductor in a state where a fitting ratio between the conductor and the coil is maximized is defined as the end position. The ferromagnetic body is located on an opposite side to the conductor with the coil interposed therebetween.

20 Claims, 10 Drawing Sheets

(51) Int. Cl.
*F16F 9/38* (2006.01)
*F16F 13/00* (2006.01)
*G01D 5/20* (2006.01)
*B60G 13/08* (2006.01)
*B60G 15/06* (2006.01)
*B62K 25/28* (2006.01)
*F16F 9/58* (2006.01)

(52) U.S. Cl.
CPC ........... *G01D 5/2013* (2013.01); *B60G 13/08* (2013.01); *B60G 15/062* (2013.01); *B60G 15/063* (2013.01); *B60G 2202/24* (2013.01); *B60G 2202/312* (2013.01); *B60G 2204/1242* (2013.01); *B60G 2206/41* (2013.01); *B60G 2206/73* (2013.01); *B60G 2300/12* (2013.01); *B60G 2400/252* (2013.01); *B60G 2401/17* (2013.01); *B60G 2800/162* (2013.01); *B62K 25/283* (2013.01); *F16F 9/58* (2013.01); *F16F 2224/025* (2013.01); *F16F 2230/0023* (2013.01); *F16F 2230/0047* (2013.01); *F16F 2230/08* (2013.01)

(58) Field of Classification Search
CPC ....... F16F 2230/0023; F16F 2230/0047; F16F 2230/08; B60G 15/063; B60G 13/08; B60G 15/062; B60G 2202/24; B60G 2202/312; B60G 2204/1242; B60G 2206/73; B60G 2206/41; B60G 2300/12; B60G 2400/252; B60G 2401/17; B60G 2800/162; G01D 5/2013; B62K 25/283
See application file for complete search history.

(56) References Cited

U.S. PATENT DOCUMENTS

| | | | |
|---|---|---|---|
| 5,644,227 A * | 7/1997 | Geisel | ................... C03B 9/1936 |
| | | | 324/207.15 |
| 2011/0203360 A1 | 8/2011 | Holliday et al. | |
| 2015/0270058 A1 | 9/2015 | Golko et al. | |
| 2016/0265943 A1 | 9/2016 | Murakami | |
| 2016/0265945 A1 | 9/2016 | Murakami | |
| 2016/0288867 A1* | 10/2016 | Murakami | ............ F16F 9/3292 |

FOREIGN PATENT DOCUMENTS

| | | |
|---|---|---|
| JP | 2013-520636 A | 6/2013 |
| JP | 2016-165984 A | 9/2016 |
| JP | 2016-166845 A | 9/2016 |
| JP | 2017-517241 A | 6/2017 |

OTHER PUBLICATIONS

International Search Report dated Dec. 19, 2017 for the corresponding PCT International Patent Application No. PCT/JP2017/038972.
Extended European Search Report dated Jun. 7, 2021 for the corresponding European Patent Application No. 17929029.1.

* cited by examiner

STROKE SENSOR SYSTEM AND SHOCK ABSORBER

CROSS-REFERENCE TO RELATED APPLICATIONS

This application is a continuation of PCT application No. PCT/JP2017/038972 filed on Oct. 27, 2017, which claims the benefit of priority to Japanese Patent Application No. 2017-201851 filed on Oct. 18, 2017, the contents of which are incorporated herein by reference.

TECHNICAL FIELD

The present invention relates to a stroke sensor system and a shock absorber including the stroke sensor system.

BACKGROUND ART

PTL 1 and 2 disclose a stroke sensor system including a movement amount deriving unit which obtains a movement amount when a cylinder and a rod inserted into the cylinder move relatively. In the stroke sensor system, a protective member (guide) is provided to protect the rod and a coil for obtaining the movement amount is provided inside the protective member.

PTL 1: JP-A-2016-165984
PTL 2: JP-A-2016-166845

SUMMARY OF INVENTION

When a ratio of fitting of the coil and the cylinder, which is a conductor, is increased, a change (hereinafter sometimes referred to as "sensor gain") in a stroke sensor output value (sensor value) per unit fitting length becomes small, and thus there is a problem that the function as a stroke sensor deteriorates.

An object of the invention is to realize a stroke sensor system or the like which can increase a sensor gain at the end of a stroke.

According to an aspect of the invention, there is provided a stroke sensor system which includes a conductor, a coil which moves relative to the conductor and is fitted to one end side of the conductor, and a ferromagnetic body which is arranged on an end position side of the coil when a position of an end portion on one end side of the conductor in a state where a fitting ratio between the conductor and the coil is maximized is defined as the end position, where the ferromagnetic body is located on an opposite side to the conductor with the coil interposed therebetween.

According to the stroke sensor system of the aspect of the invention, the sensor gain at the end of the stroke can be increased.

DESCRIPTION OF EMBODIMENTS

Embodiment 1

In the conventional stroke sensor system, a sensor gain is small in a state (end of stroke) where a fitting ratio between a conductor and a coil is the highest. For this reason, it is difficult to obtain a stroke amount with high accuracy at the end of the stroke.

The inventor of the present application has found that it is possible to increase the sensor gain by arranging a ferromagnetic body at or near a position where an axle-side end portion of a cylinder reaches at the end of the stroke. Therefore, the inventor of the present application has come up with the present embodiments. Details of the embodiments will be described below.

<Configuration of Shock Absorber 1>

A shock absorber 1 is provided in a vehicle, for example, a motorcycle. The shock absorber 1 is preferably used particularly for buffering an impact received from a road surface between a rear axle of a vehicle and the vehicle body. Further, in the shock absorber 1, an axle side (one end side) and a vehicle body side (the other end side) are fixed. In the following description, a direction from the axle side to the vehicle body side (or the opposite direction) is referred to as an axial direction and a direction of rotation about the axial direction is referred to as a circumferential direction.

Figure 1:
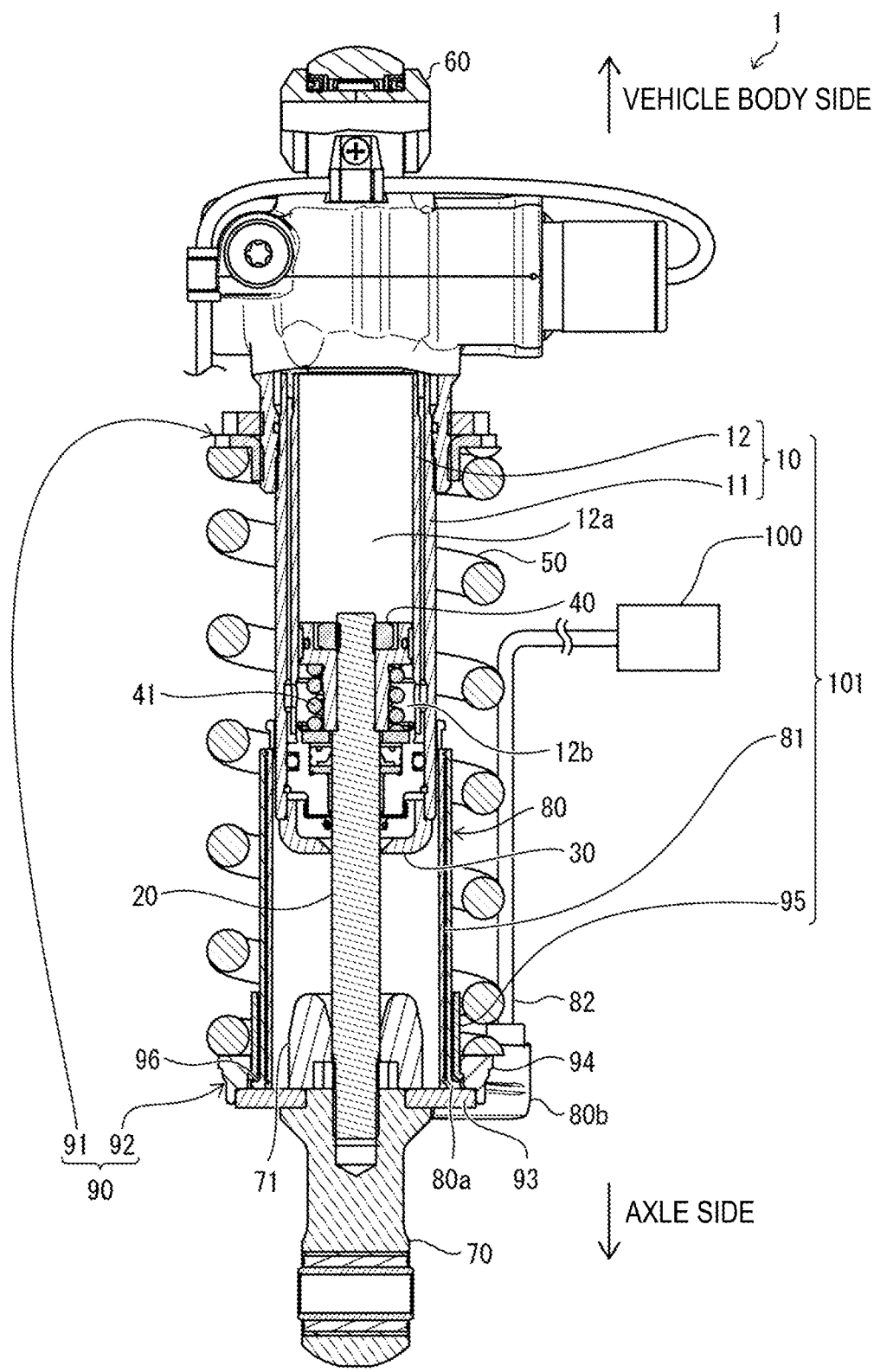
FIG. 1 is a cross-sectional view illustrating a configuration of a shock absorber according to a first embodiment.

FIG. 1 is a cross-sectional view illustrating a configuration of the shock absorber 1 according to the embodiment. The shock absorber 1 includes a stroke sensor system 101 in which the stroke amount of the shock absorber 1 is measured by a stroke measuring device 100. As illustrated in FIG. 1, the shock absorber 1 includes a cylinder 10 (conductor), a piston rod 20 (rod), a rod guide 30, a piston 40, a suspension spring 50, an attachment member 60, an attachment member 70, a protector 80 (protective member), a spring receiving mechanism 90, and the stroke measuring device 100.

The cylinder 10 is a cylindrical member extending in an axial direction of the shock absorber 1. The cylinder 10 is made of a conductive material and functions as a conductor. In addition, the cylinder 10 is constituted by a double pipe of an outer cylinder 11 and an inner cylinder 12. The vehicle-body-side end portions of the outer cylinder 11 and the inner cylinder 12 are closed and fixed to the attachment member 60. The rod guide 30 is fixed to an opening portion of the axle-side end portion of the outer cylinder 11. A predetermined interval for oil to flow in is provided between the outer cylinder 11 and the inner cylinder 12.

The piston rod 20 is a rod-shaped member extending in the axial direction of the shock absorber 1 and is inserted into the cylinder 10 together with piston 40, and further axially moved in the cylinder 10. The piston rod 20 is connected with the piston 40 at the end portion on the vehicle body side and with the attachment member 70 at the end portion on the axle side.

The rod guide 30 is a member which makes the piston rod 20 penetrate therethrough and supports the piston rod 20 and is fluid-tightly fixed to the inner periphery of the axle-side end portion of the outer cylinder 11 of the cylinder 10. A bump rubber 71 is disposed around the axle-side end portion of the piston rod 20. The bump rubber 71 absorbs the shock when an axle-side end surface of the rod guide 30 comes into contact with the attachment member 70 when the shock absorber 1 is most compressed in the compression stroke.

The piston 40 partitions the inside of the inner cylinder 12 into an oil chamber 12a and an oil chamber 12b and slides on the inner surface of the inner cylinder 12. In addition, around the piston rod 20 between the piston 40 and the rod guide 30, there is provided a rebound spring 41 which regulates the expansion side stroke of the shock absorber 1.

The suspension spring 50 absorbs vibration that the rear wheel of the vehicle receives due to the unevenness of the road surface by expanding and contracting. The suspension spring 50 is disposed outside the cylinder 10 and the protector 80. The axial position of the suspension spring 50 is determined by being supported by the spring receiving mechanism 90 described below.

The attachment member 60 is a member for attaching the shock absorber 1 to the vehicle body and is coupled to the cylinder 10 so as to cover the outer periphery of the vehicle-body-side end portion of the outer cylinder 11. The attachment member 60 is formed of a nonferrous metal (nonmagnetic material) such as aluminum.

The attachment member 70 is a member for attaching the shock absorber 1 to the axle and supports the axle-side end portion of the protector 80. In addition, a female screw is formed at a vehicle-body-side end portion of the attachment member 70. This female screw is screwed with a male screw provided at the axle-side end portion of the piston rod 20.

The spring receiving mechanism 90 has a spring receiving portion 91 provided on the vehicle body side and a spring receiving portion 92 provided on the axle side. The spring receiving portion 91 is fixed to the vehicle body side of the cylinder 10 so as to receive the load of the suspension spring 50 on the vehicle body side. The spring receiving portion 92 is fixed to the axle side of the shock absorber 1 so as to receive the load of the suspension spring 50 on the axle side.

The protector 80 is a member which is made of, for example, a resin and has a cylindrical shape extending in the axial direction of the shock absorber 1. The protector 80 is provided so as to cover an exposed part of the piston rod 20 in order to protect the piston rod 20 from flying pebbles and the like. Inside the protector 80, a coil 81 is provided from the vehicle-body-side end portion of the protector 80 to the axle-side end portion. The coil 81 is provided for measuring the stroke amount (relative position between the cylinder 10 and the protector 80). As the shock absorber 1 is compressed and expanded, the protector 80 moves relative to the cylinder 10 and fits with one end side of the cylinder 10.

The protector 80 has an inner diameter larger than the outer diameter of the outer cylinder 11 of the cylinder 10 so as to receive at least a part of the cylinder 10 from the vehicle body side to the inner portion. When the protector 80 and the outer cylinder 11 move relative to each other, the axial length (fitting length) in which the protector 80 and the outer cylinder 11 are fitted changes. By measuring the fitting length with the stroke measuring device 100, the stroke amount of the shock absorber 1 can be measured.

Figure 2:
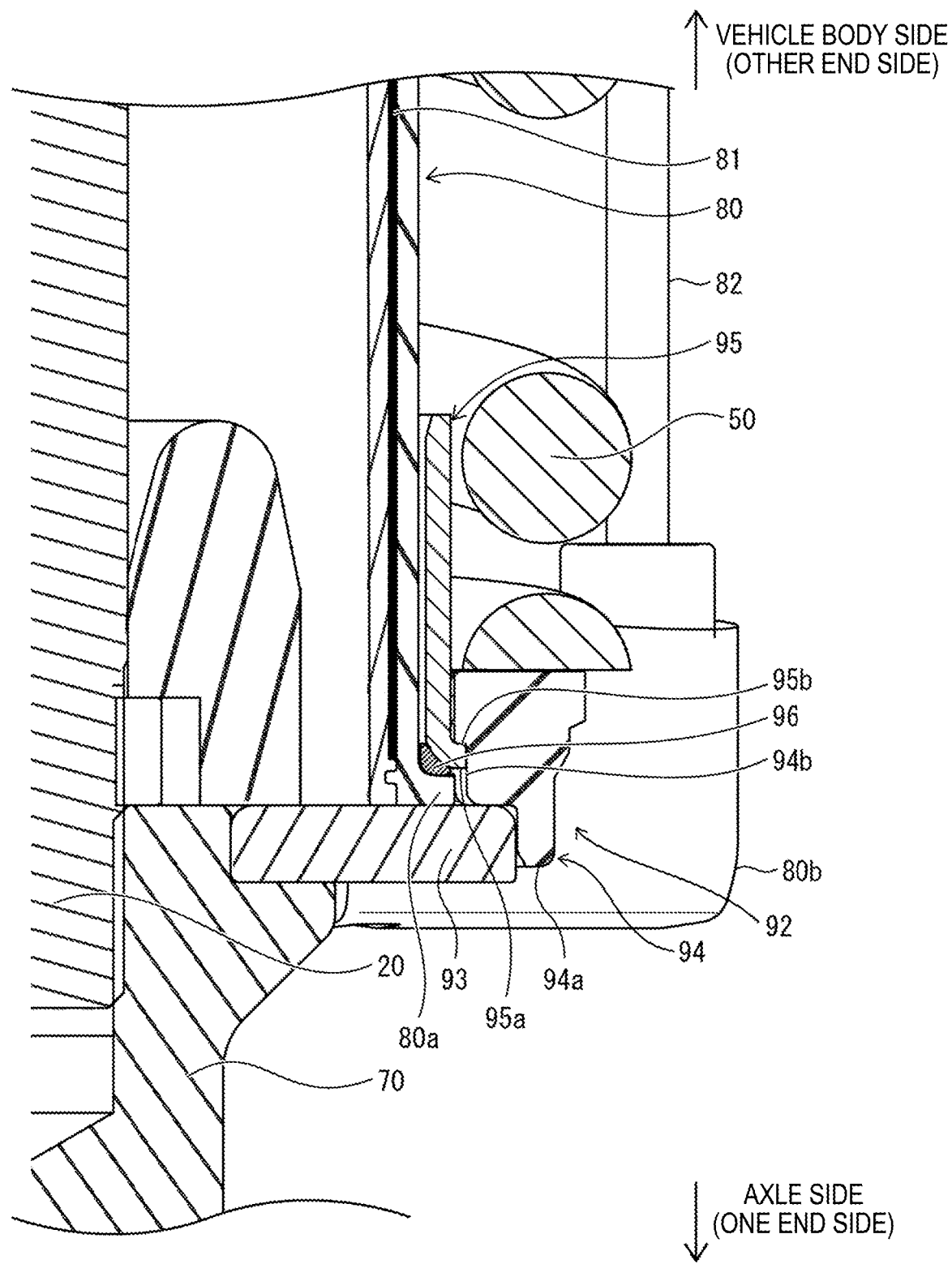
FIG. 2 is an enlarged cross-sectional view illustrating a part of the shock absorber.

FIG. 2 is an enlarged cross-sectional view illustrating a part of the shock absorber 1. As illustrated in FIG. 2, a flange portion 80a and a terminal portion 80b are provided at the axle-side end portion of the protector 80. The flange portion 80a is formed to extend in the radial direction of the protector 80 and in the direction away from the piston rod 20. An annular O-ring 96 having elasticity is disposed between the outer peripheral surface of the flange portion 80a and the inner peripheral surface of the collar 95 and urges the protector 80 toward a side on which the piston rod 20 is located.

In the terminal portion 80b, an end portion of a signal line 82 which electrically connects the coil 81 and the stroke measuring device 100 is disposed. Further, in the terminal portion 80b, both ends of the coil 81 and the signal line 82 are electrically connected.

The spring receiving portion 92 includes a sheet stopper 93, a spring receiver 94, a collar 95 (ferromagnetic body), and the O-ring 96.

The spring receiver 94 is an annular member provided to receive the spring load of the suspension spring 50 on the axle side and is disposed in the vicinity of the axle-side end portion of the protector 80.

Figure 3:
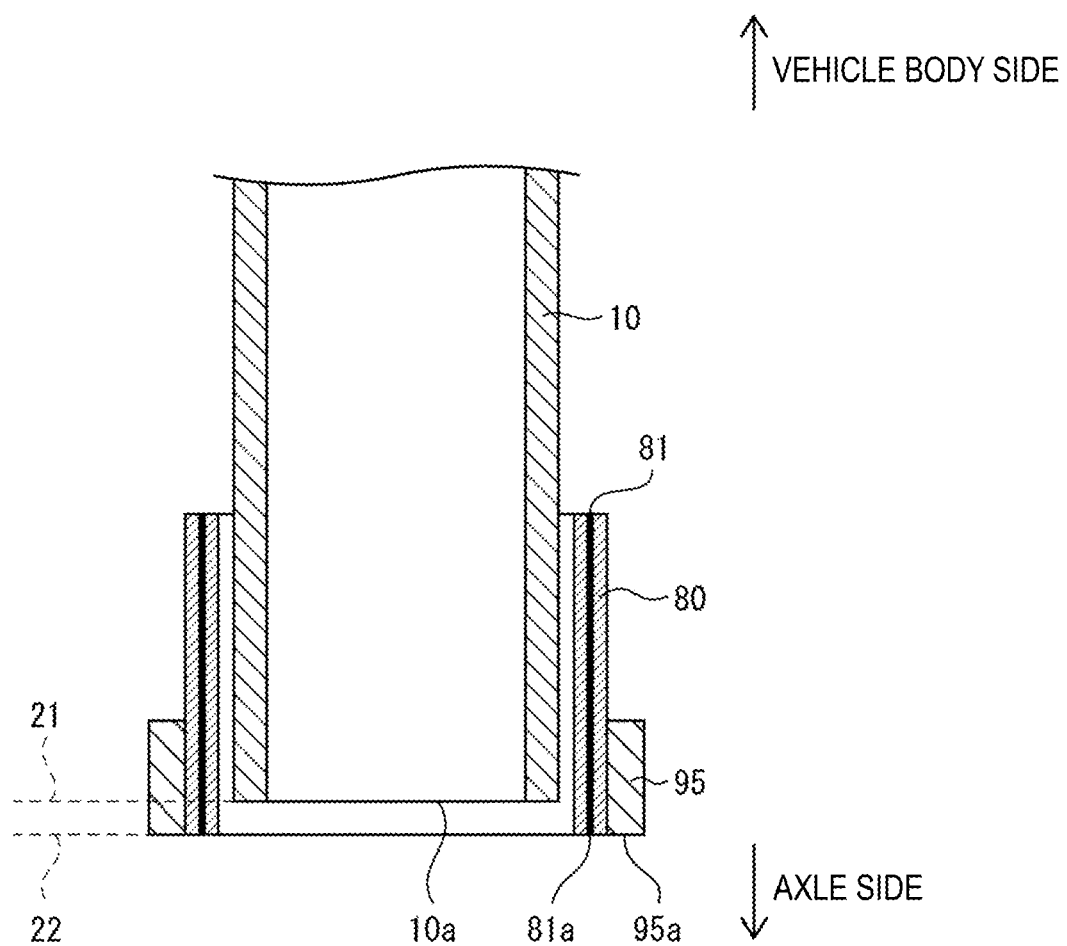
FIG. 3 is a diagram conceptually illustrating an arrangement of a collar.

The collar 95 is a cylindrical member disposed on the axle side of the protector 80. In the embodiment, the collar 95 contains iron. In addition, the collar 95 may contain cobalt. FIG. 3 is a diagram conceptually illustrating the arrangement of the collar 95. In FIG. 3, members other than the cylinder 10, the coil 81, and the collar 95 are omitted. As illustrated in FIG. 3, an end position 21 is a position of an axle-side end portion 10a of the cylinder 10 in a state where the fitting ratio between the cylinder 10 and the coil 81 is maximized. In other words, the end position 21 is the position of the end portion 10a when the shock absorber 1 is most compressed. An axle-side end portion 81a of the coil 81 and an axle-side end portion 95a of the collar 95 are located further on the axle side than the end position 21. That is, the collar 95 is arranged on the end portion 81a side closer to the end position 21 among both ends of the coil 81. In FIG. 3, for convenience, the positions of the end portion 81a and the end portion 95a are denoted by reference numerals 22 as being the same.

Since the end portion 95a is positioned closer to the axle side than the end position 21, the collar 95 can surround the end portion 10a at the end position 21 from the outside of the coil 81.

The end portion 95a may be arranged at the same position as the end position 21 in the axial direction of the shock absorber 1. Also, in the example illustrated in FIG. 3, the length of the collar 95 is shorter than that of the coil 81, but the length of the collar 95 may be the same as that of the coil 81. However, in order to reduce the weight of the shock absorber 1, it is preferable not to make the collar 95 longer than necessary.

The collar 95 has an inner diameter that is larger than the outer diameter of the protector 80. The length of the collar 95 in the axial direction is preferably 15% or more with respect to the length of the coil 81. In the embodiment, the collar 95 is disposed at a position adjacent to the spring receiver 94. However, the collar 95 may be formed integrally with the spring receiver 94. Further, the collar 95 may be a thin sheet-shaped member and may be attached to the protector 80 using an adhesive.

As illustrated in FIG. 2, a flange portion 95*b* is provided at the end portion 95*a* of the collar 95. The flange portion 95*b* is formed so as to extend in the radial direction of the collar 95 and in the direction away from the piston rod 20. The flange portion 95*b* is locked to a step portion 94*b* of the spring receiver 94.

The step portion 94*b* is a portion which is recessed radially outward from the inner peripheral surface of the vehicle-body-side end portion of the spring receiver 94 and is formed over the entire inner periphery of the spring receiver 94. The step portion 94*b* prevents the collar 95 from moving toward the vehicle body side. Therefore, the relative position between the coil 81 and the collar 95 is fixed.

Figure 4:
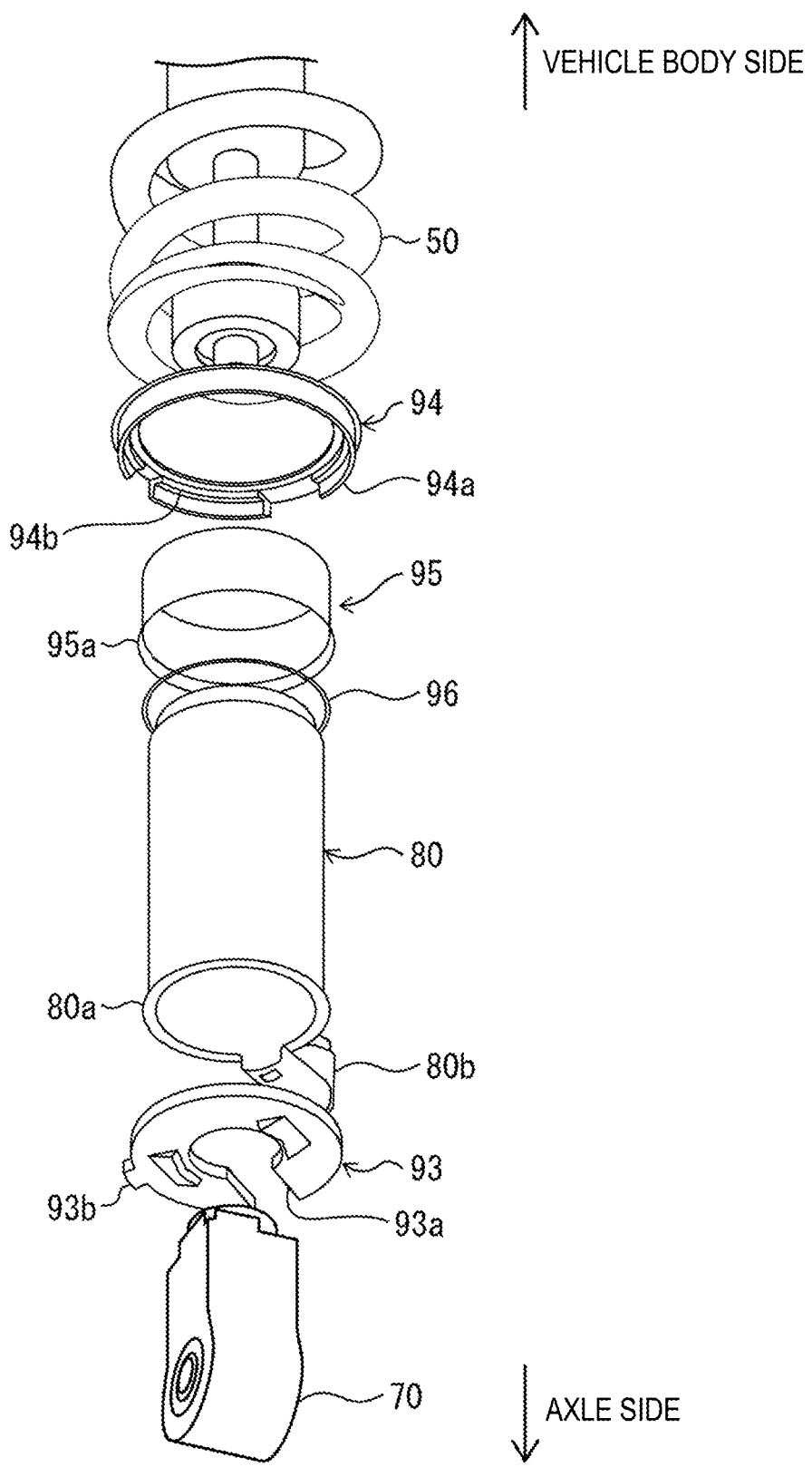
FIG. 4 is an exploded perspective view illustrating a configuration of an axle side of the shock absorber.

FIG. 4 is an exploded perspective view illustrating the configuration of the axle side of the shock absorber 1. As illustrated in FIG. 4, the sheet stopper 93 is a flat and annular member and has an outer diameter larger than the outer diameter of the flange portion 80*a* of the protector 80. The sheet stopper 93 is fixed by being fitted to the vehicle-body-side end portion of the attachment member 70 on the inner peripheral end surface. The sheet stopper 93 is disposed so as to block a part of the axle-side opening portion of the protector 80 in a state of being fixed to the attachment member 70.

Figure 5:
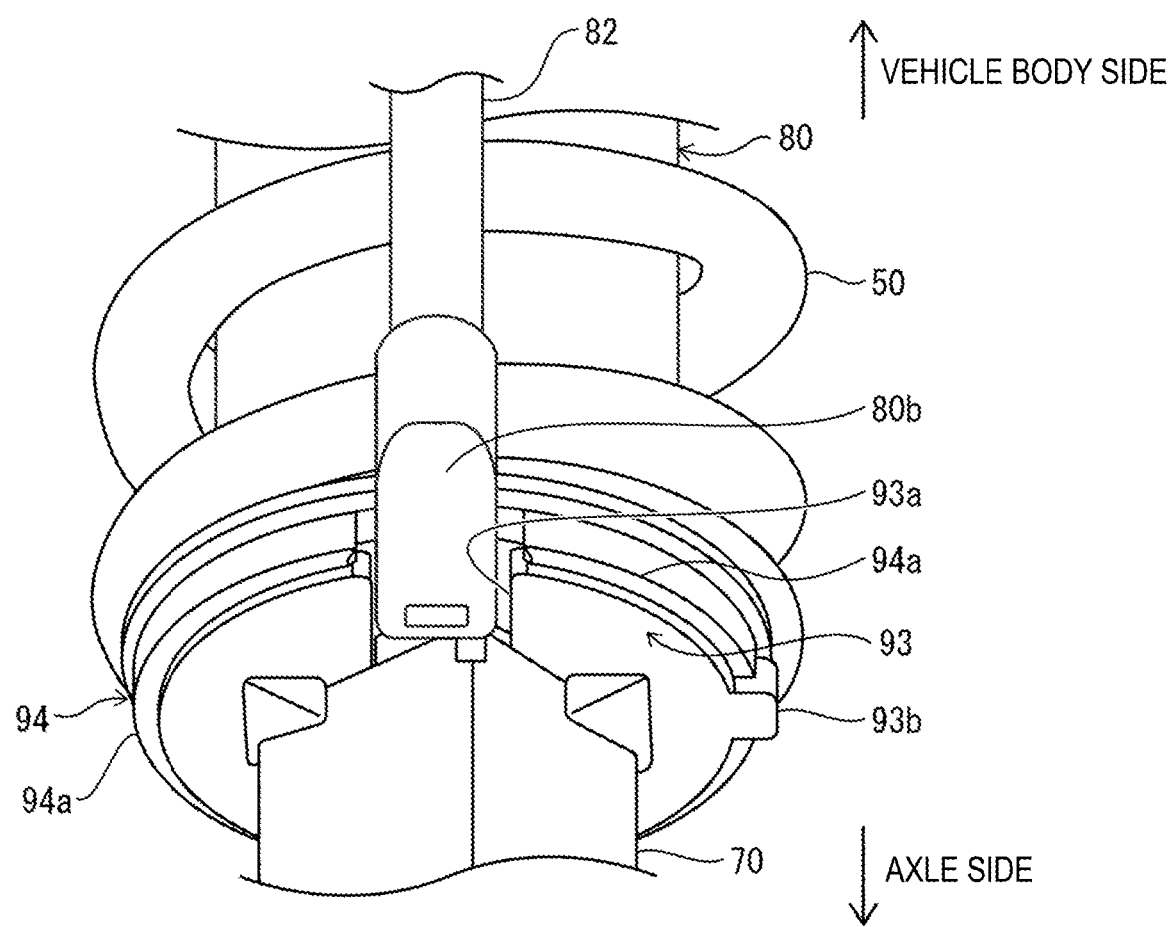
FIG. 5 is an enlarged perspective view illustrating a part of the shock absorber.

FIG. 5 is an enlarged perspective view illustrating a part of the shock absorber 1. As illustrated in FIG. 5, the sheet stopper 93 has a C-shape by having one notch portion 93*a*. The notch portion 93*a* is formed so as to correspond to the shape of the terminal portion 80*b* of the protector 80. By inserting the terminal portion 80*b* into the notch portion 93*a*, the movement of the protector 80 in the circumferential direction is suppressed. Further, the sheet stopper 93 has a protrusion portion 93*b* which restricts the rotation of the sheet stopper 93 relative to the spring receiver 94 at the outer peripheral edge.

The spring receiver 94 is provided with a plurality of extending walls 94*a* extending from the outer peripheral surface of the spring receiver 94 to the axle side. The terminal portion 80*b* is disposed between two adjacent extending walls 94*a* and the protrusion portion 93*b* is disposed between the other two adjacent extending walls 94*a*.

Figure 6A:
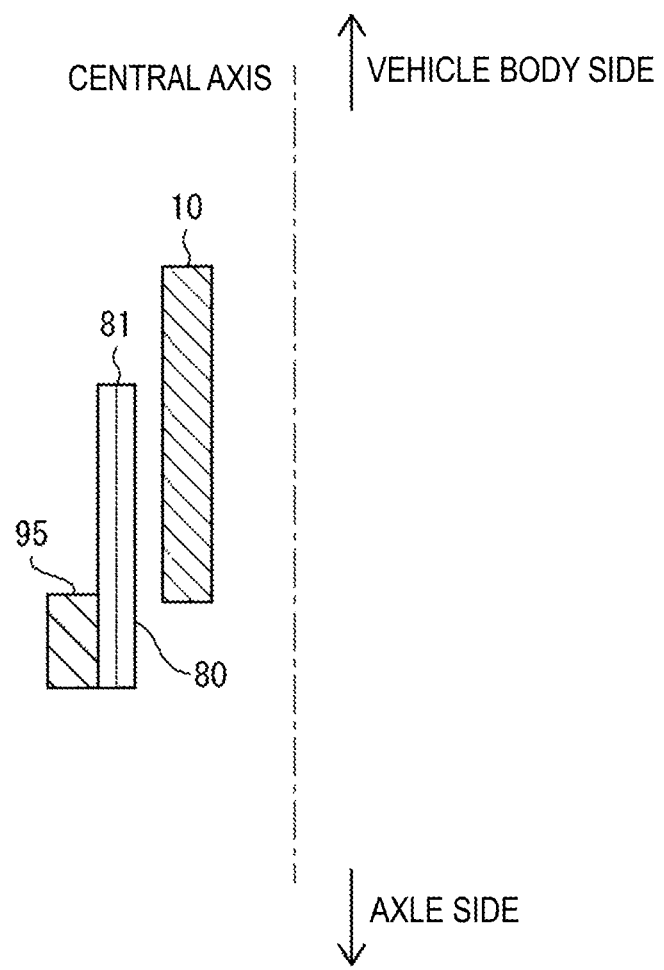
FIG. 6A is a cross-sectional view illustrating an example of a positional relationship between a cylinder and a collar with respect to a coil included in the shock absorber.
Figure 6B:
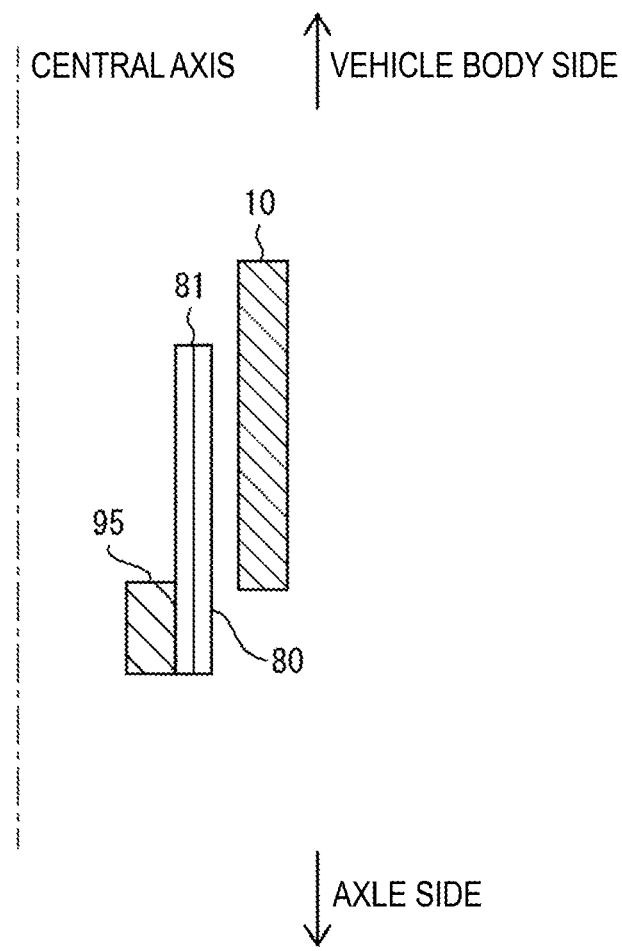
FIG. 6B is a cross-sectional view illustrating another example of the positional relationship between the cylinder and the collar with respect to the coil included in the shock absorber.

FIG. 6A is a cross-sectional view illustrating an example of the positional relationship between the cylinder 10 and the collar 95 with respect to the coil 81. FIG. 6B is a cross-sectional view illustrating another example of the positional relationship. In FIGS. 6A and 6B, the common central axis of the cylinder 10, the coil 81, and the collar 95 is indicated by a one-dot chain line.

In the embodiment, as illustrated in FIG. 6A, the cylinder 10 is located on the inside (side closer to the central axis) with respect to the coil 81 and the collar 95 is located on the outside (side far from the central axis) with respect to the coil 81. However, as illustrated in FIG. 6B, the cylinder 10 may be located outside the coil 81. When the cylinder 10 is located on the outside with respect to the coil 81, the collar 95 is located on the inside with respect to the coil 81. As described above, the collar 95 may be located on the opposite side to the cylinder 10 with the coil 81 interposed therebetween.

<Configuration of Stroke Sensor System 101>

As illustrated in FIG. 1, the coil 81 of the shock absorber 1 is connected to the stroke measuring device 100 via the signal line 82. The stroke measuring device 100 is realized by, for example, a control device provided in a vehicle.

Figure 7:
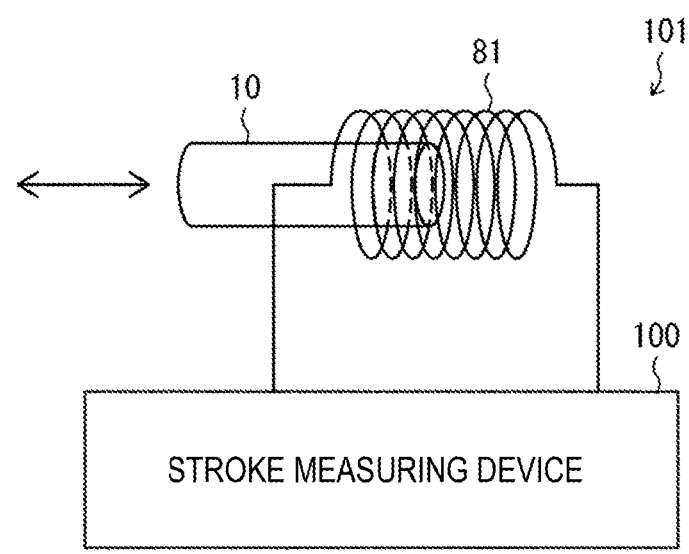
FIG. 7 is a diagram illustrating a configuration of a stroke sensor system connected to the shock absorber.

FIG. 7 is a diagram illustrating the configuration of the stroke sensor system 101 provided in the shock absorber 1. As illustrated in FIGS. 1 and 7, the stroke sensor system 101 includes the cylinder 10, the coil 81, the collar 95, and the stroke measuring device 100. The collar 95 is omitted in FIG. 7.

The stroke measuring device 100 has a capacitor (not illustrated). The capacitor is electrically connected to the coil 81 to constitute an LC oscillation circuit together with the coil 81. The resonance frequency of the LC oscillation circuit changes according to the change in the stroke amount of the shock absorber 1.

The stroke measuring device 100 outputs a stroke amount by performing predetermined processing on the oscillation signal output from the LC oscillation circuit. For the above processing, known processing disclosed in Patent Literature 1 and the like can be applied.

In the stroke sensor system 101, the fitting length at which the cylinder 10, which is a conductor, and the coil 81 are fitted varies according to the stroke amount of the shock absorber 1. When the shock absorber 1 extends, the fitting length becomes shorter, and when the shock absorber 1 contracts, the fitting length becomes longer.

When an alternating current is made to flow to the coil 81 when the fitting length changes, an eddy current is generated in the cylinder 10 so as to cancel the fluctuation of the magnetic field. Due to the action of eddy current, the magnetic field around coil 81 is reduced. That is, the inductance of the coil 81 is apparently reduced by the eddy current. When the fitting length is short (when the shock absorber 1 is extended), the influence of the eddy current is small, so that the inductance becomes larger. On the other hand, when the fitting length is long (when the shock absorber 1 is contracted), the influence of the eddy current is large, so that the inductance becomes smaller.

A resonance frequency f0 of the LC oscillation circuit is expressed as $f0=1/(2\pi\sqrt{(LC)})$, where L is the inductance of the coil 81 and C is the capacitance of the capacitor. As a result, when the inductance L is large, the resonance frequency f0 becomes small, whereas when the inductance L is small, the resonance frequency f0 becomes large. Therefore, the stroke amount of the shock absorber 1 can be obtained from the resonance frequency.

Figure 8:
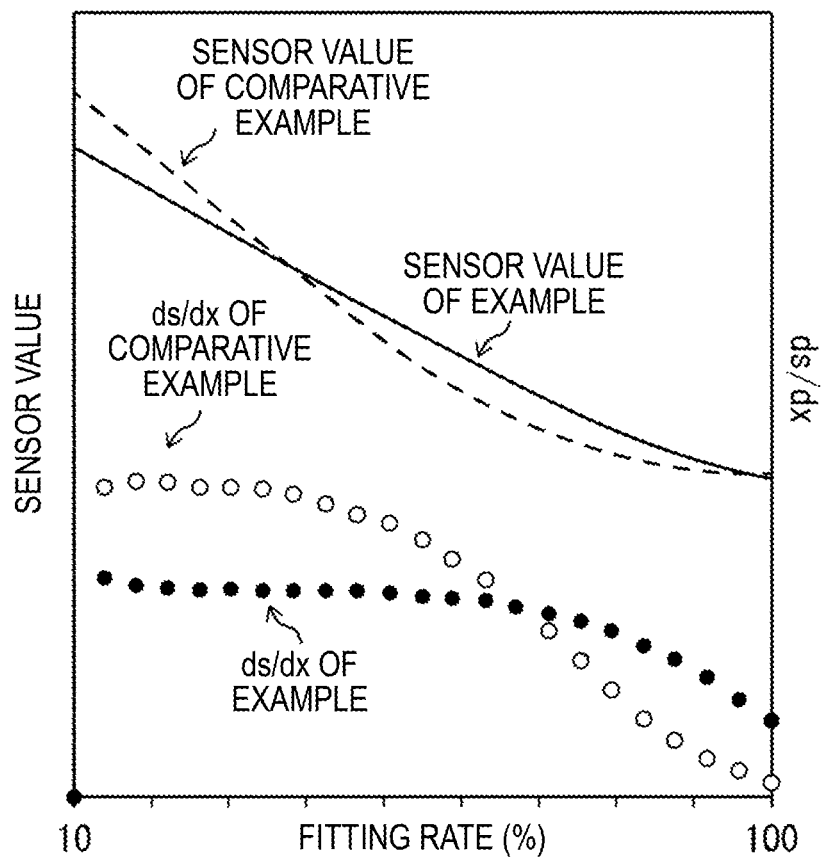
FIG. 8 is a graph illustrating a relationship between a fitting ratio and a sensor value in the stroke sensor system and a relationship between the fitting ratio and an amount of change in a sensor value per unit stroke length.

FIG. 8 is a graph illustrating the relationship between the fitting ratio and the sensor value and the relationship between the fitting ratio and the sensor gain in the stroke sensor system 101 (indicated as an example in FIG. 8) and a stroke sensor system of a comparative example. The stroke sensor system of the comparative example has the same configuration as the stroke sensor system 101 except that the collar 95 is not provided.

The fitting ratio is a ratio of the fitting length to the length of the coil 81 in the axial direction. Even when the shock absorber 1 is in the most extended state, the vehicle-body-side end portion of the coil 81 and the axle-side end portion of the cylinder 10 are fitted and the lower limit of the fitting ratio is 10%.

The sensor gain is a value obtained by differentiating the sensor value with respect to the stroke length and is a value indicating how much the sensor value changes when the piston rod 20 moves relative to the cylinder 10 by a minute unit distance. In other words, the sensor gain is a value indicating how much the sensor value changes when the fitting ratio changes by a minute unit ratio. When s is set as the sensor value and x is set as the stroke length, the sensor gain can be expressed by ds/dx.

As illustrated in FIG. 8, in both the stroke sensor system 101 (example) and the stroke sensor system of the comparative example, both the sensor value and the sensor gain (ds/dx) are small at the end of the stroke, that is, in a region where the fitting ratio is close to 100%. In particular, in the comparative example, the sensor gain (ds/dx) is close to zero.

On the other hand, in a case of the stroke sensor system 101, the sensor gain (ds/dx) at the end of the stroke is sufficiently larger than the value in the comparative example. Therefore, the stroke sensor system 101 can increase the sensor gain at the end of the stroke.

<Effect of Shock Absorber 1>

As described above, the shock absorber 1 includes the stroke sensor system 101. The stroke sensor system 101 includes the cylinder 10, the coil 81 which moves relative to the cylinder 10 and is fitted to the axle side of the cylinder 10, and the collar 95 arranged on the end position side of the coil 81 when the position of the axle-side end portion of the cylinder 10 in a state where the fitting ratio between the cylinder 10 and the coil 81 is maximized is set as the end position. The collar 95 is located on the opposite side to the cylinder 10 with the coil 81 interposed therebetween.

With the configuration described above, the sensor gain at the end of the stroke can be increased.

In the stroke sensor system 101, the collar 95 contains iron or cobalt. By arranging the collar 95 containing iron or cobalt on the end position side of the coil 81, the sensor gain can be increased.

Further, the shock absorber 1 is disposed on the axle side of the piston rod 20 and further includes the cylindrical protector 80 which receives the axle side of the cylinder 10. Also, the coil 81 is disposed inside the protector 80.

According to the configuration described above, by providing the coil 81 inside the protector 80 which protects the piston rod 20, there is no need to additionally provide a member for arranging the coil 81, and thus the configuration of the shock absorber 1 can be simplified.

The shock absorber 1 further includes the suspension spring 50 arranged outside the cylinder 10 and the spring receiver 94 which receives the load of the suspension spring 50 on the axle side of the piston rod 20. The collar 95 is formed integrally with the spring receiver 94 or is disposed adjacent to the spring receiver 94. The spring receiver 94 is disposed at the stroke end position in the shock absorber 1.

By forming the collar 95 integrally with the spring receiver 94 or by arranging the collar 95 at the position adjacent to the spring receiver 94, while satisfying the condition that the collar 95 is arranged at the end position of the stroke, it is possible to realize a rational structure in consideration of the positional relationship with other members.

Second Embodiment

Another embodiment of the invention will be described below.

Figure 9A:
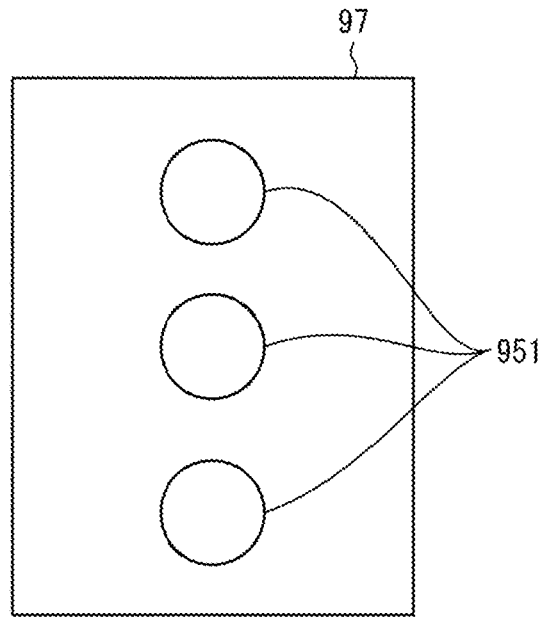
FIG. 9A is a side view of a collar having a plurality of opening portions on a side surface.
Figure 9B:
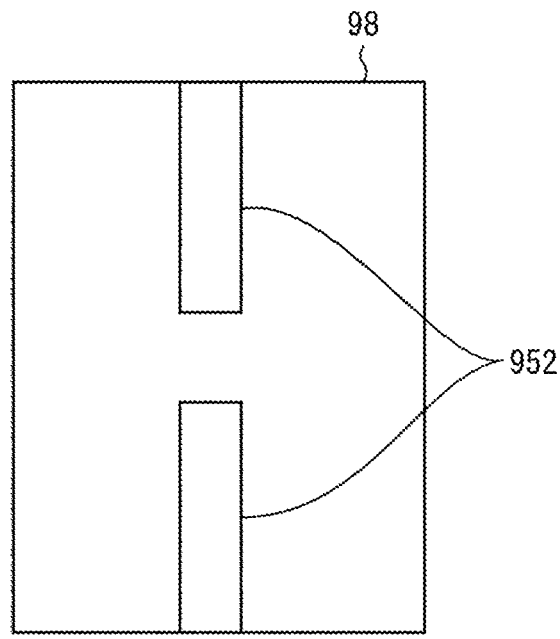
FIG. 9B is a side view of a collar having a notch portion.
Figure 9C:
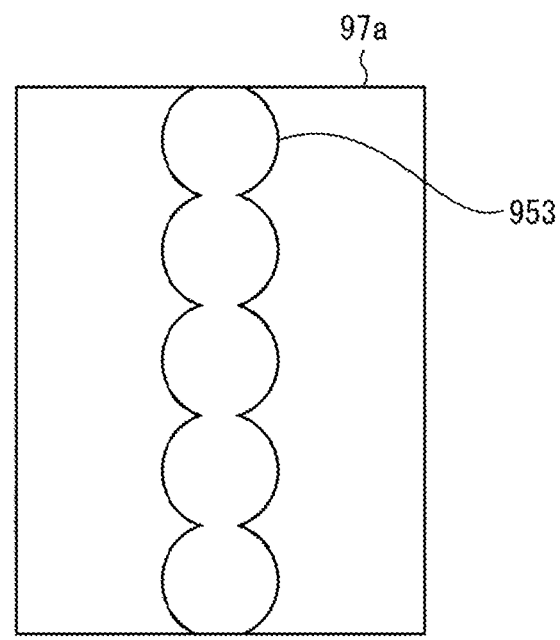
FIG. 9C is a side view of a collar having an opening portion formed continuously from one end to the other end on a side surface.
Figure 9D:
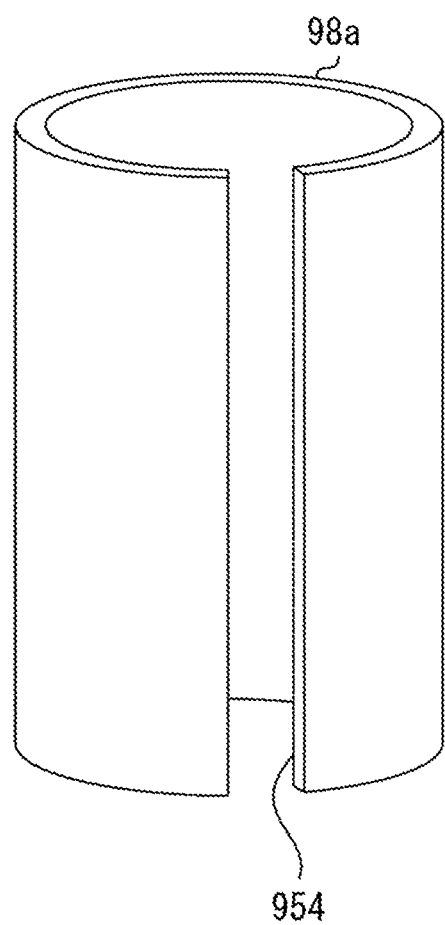
FIG. 9D is a perspective view of a collar having a notch portion extending from one end to the other end on a side surface.

FIG. 9A is a side view of a collar 97 (ferromagnetic body) according to the embodiment and FIG. 9B is a side view of another collar 98 (ferromagnetic body) according to the embodiment. 9C is a side view illustrating a collar 97a which is a modification example of the collar 97 and FIG. 9D is a perspective view illustrating a collar 98a which is a modification example of the collar 98. The collars 97, 97a, and 98 all have a substantially cylindrical shape, but are represented by rectangles in FIGS. 9A to 9C. In addition, in FIGS. 9A to 9D, the flange portion 95b is omitted.

Both collars 97 and 98 have a cylindrical shape. Specifically, as illustrated in FIG. 9A, the collar 97 has an opening portion 951 on the side surface. Further, as illustrated in FIG. 9B, the collar 98 has a notch portion 952 on the side surface.

Therefore, in the collars 97 and 98, part of the eddy current accompanying the change in stroke is blocked by the opening portion 951 or the notch portion 952. In other words, the resistance value of the collars 97 and 98 with respect to the current is larger than the resistance value of the collar 95 with respect to the current.

When the eddy current flowing through the collar 95 is increased, there is a possibility that the sensitivity of the stroke sensor system 101 is decreased. By using the collar 97 or 98 instead of the collar 95, the eddy current flowing through the collars 97 or 98 can be suppressed, and thus the sensitivity of the stroke sensor system 101 can be increased.

The shape and number of the opening portions 951 illustrated in FIG. 9A and the shape and number of the notch portions 952 illustrated in FIG. 9B are examples. The collars 97 and 98 may have different shapes and numbers of the opening portions 951 or the notch portions 952. Furthermore, one collar 97 or 98 may have both the opening portion 951 and the notch portion 952.

Further, the opening portions 951 illustrated in FIG. 9A and the notch portions 952 illustrated in FIG. 9B are regularly provided so as to be aligned in the axial direction. However, the opening portions 951 and the notch portions 952 may be provided irregularly.

Furthermore, as illustrated in FIG. 9C, the collar 97a having a continuous notch portion 953 may be realized by forming the opening portions 951 continuously from one end side to the other end side of the collar 97. Similarly, as illustrated in FIG. 9D, the collar 98a may be realized by forming a notch portion 954 continuous from one end side to the other end side in the collar 98. By forming the notch portion 953/954 continuous from one end side to the other end in this manner, the eddy current flowing through the collar 97a/98a can be more effectively suppressed than in a case of the collar 97/98.

Further, from the viewpoint of maintaining the shape of the collar, it is preferable that the opening portion 951 and the notch portion 952 are partially formed on the side surfaces of the collar 97/98. That is, a part of a plurality of cross sections obtained by cutting the collars 97 and 98 along a plurality of planes perpendicular to the axial directions of the collars 97 and 98 are preferably annular.

ADDITIONAL NOTES

In the embodiment described above, the configuration in which the cylinder 10 is arranged on the vehicle body side and the protector 80 is arranged on the axle side has been described, but the arrangement relationship between the cylinder 10 and the protector 80 may be reversed.

In the embodiment described above, the stroke sensor system 101 is provided in the shock absorber 1. However, the stroke sensor system 101 may be provided in another device that needs to measure the stroke amount.

The invention is not limited to the embodiments described above and various modifications are possible within the scope of the claims. Embodiments obtained by appropriately combining technical means disclosed in different embodiments are also included in the technical scope of the invention.

REFERENCE SIGNS LIST 1 shock absorber
10 cylinder (conductor)
10a end portion
20 piston rod (rod)
21 end position
50 suspension spring
80 protector (protective member)
81 coil
94 spring receiver
95, 97, 98 collar (ferromagnetic body)
951 opening portion
952 notch portion
953 notch portion
954 notch portion
101 stroke sensor system

The invention claimed is:

1. A stroke sensor system, comprising:
a conductor;
a coil which moves relative to the conductor and is fitted to one end side of the conductor; and
a ferromagnetic body which is arranged on an end position side of the coil, wherein a position of an end portion on one end side of the conductor in a state where a fitting ratio between the conductor and the coil is maximized is defined as the end position,
wherein the ferromagnetic body is located on an opposite side to the conductor with the coil interposed therebetween and in an area including at least the end position, and
a length of the ferromagnetic body in a direction of the movement is shorter than a length of the coil in a direction of the movement.

2. The stroke sensor system according to claim 1, wherein the ferromagnetic body has a cylindrical shape and has an opening portion or a notch portion on a side surface of the ferromagnetic body.

3. The stroke sensor system according to claim 2, wherein the ferromagnetic body contains iron or cobalt.

4. A shock absorber which includes the stroke sensor system according to claim 2, comprising:
a cylinder configured to be the conductor;
a rod inserted into the cylinder from one end side of the cylinder;
the coil disposed on one end side of the rod; and
the ferromagnetic body disposed on one end side of the coil.

5. The shock absorber according to claim 4, further comprising:
a protective member having a cylindrical shape which is disposed on the one end side of the rod and receives one end side of the cylinder,
wherein the coil is disposed inside the protective member.

6. The shock absorber according to claim 4, further comprising:
a suspension spring disposed outside the cylinder; and
a spring receiver which receives a load of the suspension spring on the one end side of the rod,
wherein the ferromagnetic body is formed integrally with the spring receiver or is disposed at a position adjacent to the spring receiver.

7. The stroke sensor system according to claim 1, wherein the ferromagnetic body partially has a cylindrical shape and has a notch portion continuous from one end side to the other end side of the ferromagnetic body.

8. The stroke sensor system according to claim 7, wherein the ferromagnetic body contains iron or cobalt.

9. A shock absorber which includes the stroke sensor system according to claim 7, comprising:
a cylinder configured to be the conductor;
a rod inserted into the cylinder from one end side of the cylinder;
the coil disposed on one end side of the rod; and
the ferromagnetic body disposed on one end side of the coil.

10. The shock absorber according to claim 9, further comprising:
a protective member having a cylindrical shape which is disposed on the one end side of the rod and receives one end side of the cylinder,
wherein the coil is disposed inside the protective member.

11. The shock absorber according to claim 9, further comprising:
a suspension spring disposed outside the cylinder; and
a spring receiver which receives a load of the suspension spring on the one end side of the rod,
wherein the ferromagnetic body is formed integrally with the spring receiver or is disposed at a position adjacent to the spring receiver.

12. The stroke sensor system according to claim 1, wherein the ferromagnetic body contains iron or cobalt.

13. A shock absorber which includes the stroke sensor system according to claim 12, comprising:
a cylinder configured to be the conductor;
a rod inserted into the cylinder from one end side of the cylinder;
the coil disposed on one end side of the rod; and
the ferromagnetic body disposed on one end side of the coil.

14. The shock absorber according to claim 13, further comprising:
a protective member having a cylindrical shape which is disposed on the one end side of the rod and receives one end side of the cylinder,
wherein the coil is disposed inside the protective member.

15. The shock absorber according to claim 13, further comprising:
a suspension spring disposed outside the cylinder; and
a spring receiver which receives a load of the suspension spring on the one end side of the rod,
wherein the ferromagnetic body is formed integrally with the spring receiver or is disposed at a position adjacent to the spring receiver.

16. A shock absorber which includes the stroke sensor system according to claim 1, comprising:
a cylinder configured to be the conductor;
a rod inserted into the cylinder from one end side of the cylinder;
the coil disposed on one end side of the rod; and
the ferromagnetic body disposed on one end side of the coil.

17. The shock absorber according to claim 16, further comprising:
a protective member having a cylindrical shape which is disposed on the one end side of the rod and receives one end side of the cylinder,
wherein the coil is disposed inside the protective member.

18. The shock absorber according to claim 17, further comprising:
a suspension spring disposed outside the cylinder; and
a spring receiver which receives a load of the suspension spring on the one end side of the rod, wherein the ferromagnetic body is formed integrally with the spring receiver or is disposed at a position adjacent to the spring receiver.

19. The shock absorber according to claim 16, further comprising:
a suspension spring disposed outside the cylinder; and
a spring receiver which receives a load of the suspension spring on the one end side of the rod,
wherein the ferromagnetic body is formed integrally with the spring receiver or is disposed at a position adjacent to the spring receiver.

20. The stroke sensor system according to claim 1, wherein a relative position between the coil and the ferromagnetic body is fixed.

* * * * *